US006980210B1

(12) United States Patent
Weiglhofer et al.

(10) Patent No.: US 6,980,210 B1
(45) Date of Patent: *Dec. 27, 2005

(54) 3D STEREO REAL-TIME SENSOR SYSTEM, METHOD AND COMPUTER PROGRAM THEREFOR

(75) Inventors: Gerhard Weiglhofer, Schwabhausen/Weil (DE); Fritz Pauker, Friedberg (DE); Rolf Henkel, Bremen (DE)

(73) Assignee: 3-D Image Processing GmbH, Freidberg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,888

(22) Filed: Nov. 24, 1998

(30) Foreign Application Priority Data

Nov. 24, 1997 (DE) .............................. 197 52 047
Nov. 11, 1998 (DE) .............................. 198 51 993

(51) Int. Cl.$^7$ .......................................... G06F 15/00
(52) U.S. Cl. ................................................ 345/433
(58) Field of Search ............................... 345/418, 419, 345/426, 427, 118, 121, 433

(56) References Cited

U.S. PATENT DOCUMENTS

| 5,515,448 A | 5/1996 | Nishitani | .................... 382/106 |
|---|---|---|---|
| 5,874,904 A | 2/1999 | Hirabayashi et al. | ....... 340/903 |
| 6,120,450 A * | 9/2000 | Li | .............................. 600/447 |
| 6,122,659 A * | 9/2000 | Olnowich | .................... 709/213 |
| 6,124,930 A * | 9/2000 | Fercher | ...................... 356/513 |

FOREIGN PATENT DOCUMENTS

| DE | 197 35 414 A1 | 2/1998 |
|---|---|---|
| EP | 0 725 357 A2 | 8/1996 |
| WO | WO 88/02518 | 4/1988 |
| WO | W 91/20054 | 12/1991 |

OTHER PUBLICATIONS

Henkel, R D: "Fast stereovision by coherence detection", Computer Analysis of Images and Patterns, 7$^{th}$ Internat. Conf. CAIP 97 Proc., Kiel, Germany, Sep. 10-12, 1997, pp. 297-304.
EP 98 122 061.9, Search Report, Jun. 23, 1999, 5 pages.

* cited by examiner

Primary Examiner—Phu K. Nguyen
(74) Attorney, Agent, or Firm—Innovation Law Group, Ltd; Jacques M. Dulin, Esq.

(57) ABSTRACT

The invention pertains to an image processing device, in particular a device for stereoscopic image processing, and to a coherence detector used thereon. The image processing device can process stereoscopic images in real time and can be implemented with simple means and low expense. Two alternative embodiments of the coherence detector are disclosed. The image signals can be processed at the speed that they are supplied by image receivers, and thus image data processing is possible to attain depth information with little expense and in real time.

20 Claims, 11 Drawing Sheets

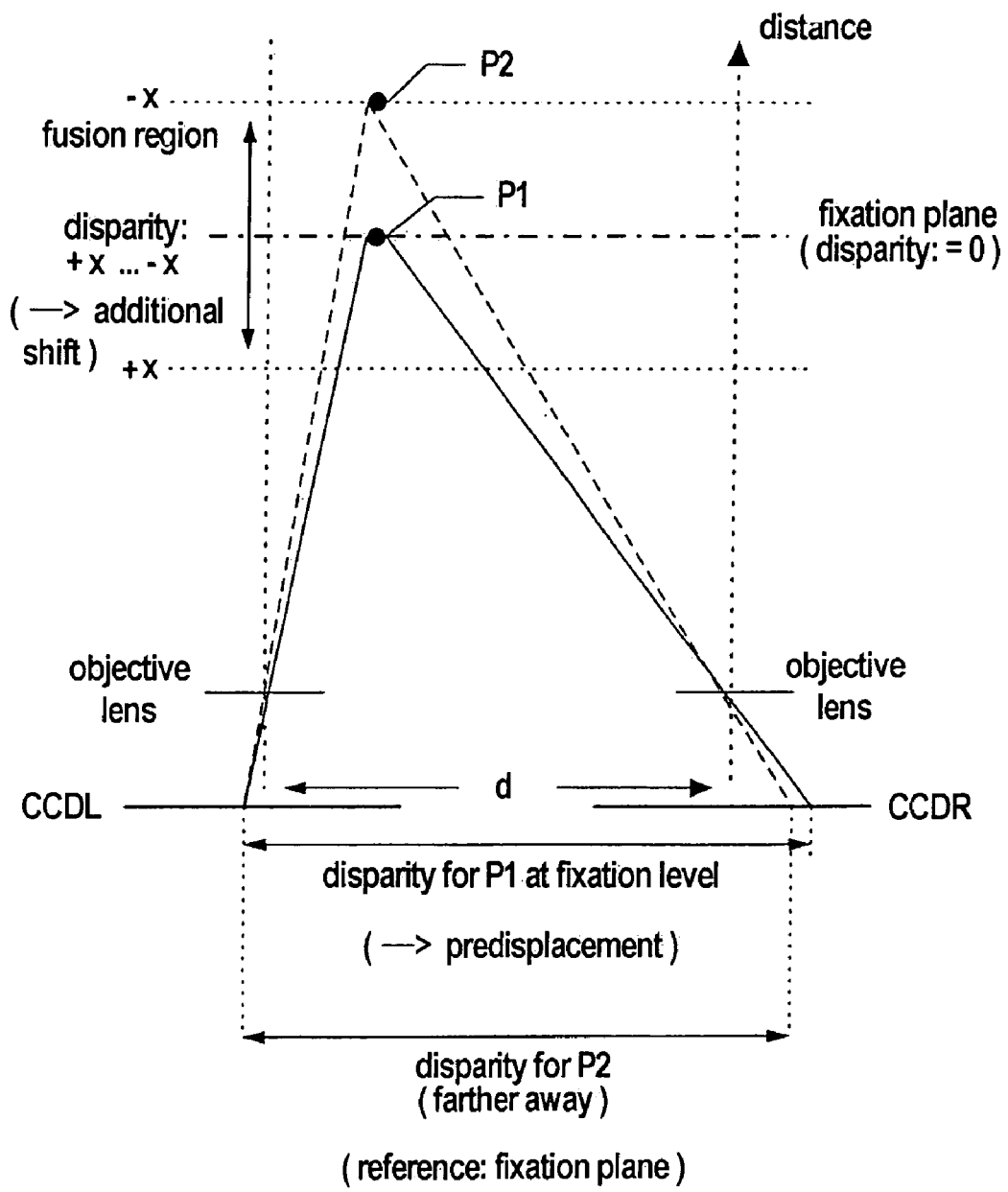

3D STEREO REAL-TIME SENSOR SYSTEM, METHOD AND COMPUTER PROGRAM THEREFOR

CROSS REFERENCE TO RELATED CASES

This Application is a based on German Patent Application P 197 52 047.2, filed 24 Nov. 1997, and on German Patent Application P 198 51 993.1, filed 11 Nov. 1998, each by the same Inventors. Applicants hereby claim the priority of each of these earlier filed foreign applications pursuant to 35 U.S.C. §119(a).

DESCRIPTION

1. Technical Field

The present invention pertains to an image processing device, and in particular a device for stereoscopic image processing, a coherence detector used thereon, and methods and computer programs therefor.

2. Background of the Invention

The optical determination of the three-dimensional environment has become increasingly important for some time. In particular in automated manufacturing processes and on the robots used therein, in addition to two-dimensional coordinates, depth information must also be available with regard to an object (to be processed), in order to control the robot appropriately, for example.

As a part of the "Ident Vision" fair in 1996 in Stuttgart (DE), a whole body scanner was presented that can use a number of lasers and cameras to determine the spatial contour of an object. However, this system is not suitable for real-time applications.

Previous designs to determine the depth information can be divided into various groups which are based on different methods.

Triangulation methods use one or more lines that are imaged either by a laser or a projection unit onto the particular object. By using one or more cameras, the object is recorded under a viewing angle that differs slightly from the projection direction. Based on the already known geometric relationships, the three-dimensional structure of the object is then determined by means of trigonometric calculations.

However, a disadvantage of this method is that under certain circumstances, one image will have to be evaluated for each projected line, which is exceptionally time-consuming, so that a system of this kind is not useful for real-time applications.

In addition, it is particularly troublesome that the particular measured object has to be illuminated. Of course, under laboratory conditions this does not pose a problem, but in practice it is nearly impossible when measurements are to be taken in situations as in road traffic or under the impeded, real situations prevailing with telescopes or microscopes. Furthermore, in the case of lasers used as line-light projectors, special accident-prevention requirements must be observed so that these measurement configurations will not pose a potential hazard to the human eye.

In one specific triangulation method, a color fan is projected onto the particular object. The color values recorded by a cameras can then be unambiguously allocated to an object point, and the shift of individual color point can, in turn, be evaluated as depth information. Although this method operates in real time, it is associated with the restrictive requirement that the object and the background must be white, so that the method cannot be used everywhere.

However, transit time methods evaluate the transit time of light, microwaves or of a sound signal as measured signal in order to draw conclusions about the spatial environment and the depth information. In this regard, one spatial direction is used and the spacing measurement is taken. For example, the principle of a radar device or of a medical ultrasound device is based on these transit time methods. However, transit time methods require a complicated signal processing, and in addition, are dependent on the properties of the surrounding medium, which affects the propagation properties of the particular measured signal.

In addition, contrast depth methods are used, but they can only be applied when the object size and the opening of an objective lens are in a certain ratio to each other, such as in microscopy. Due to the optical system, only the narrow region of the focal plane will be imaged sharply on an image sensor. The regions in front and behind are more or less not focused. The image information contained in the focal plane can be evaluated with conventional image processing methods. A corresponding evaluation then provides an elevation line of the object. Due to repeated shifting of the focal plane and subsequent evaluation, an elevation line map of the object can be produced, but it is complicated.

Another approach which has been pursued for a few years, is based on an evaluation of stereoscopic images to gain depth information, similar to spatial vision in humans; simulation of this vision is the goal of the method.

The phenomenon of spatial vision, which will be explained briefly below with reference to humans in general, is based on the perception of the visible environment by means of the two human eyes, and based on the spacing of the eyes, the two perceived images (right eye or image, left eye or image) are perceived under slightly differing viewing angles. Since the viewing axes of the eyes converge somewhat, their viewing axes meet at a point in the viewed environment, and we call this point the fixation point of the eyes. The image of this point falls on a fovea centralis of the retina. Every neighboring point in the field of vision is then projected onto one point of the retina which is located somewhat from the center of sharpest vision. In general, this spacing of the two eyes is different, and the spacing varies as a function of the spatial depth of the viewed point in the field of view relative to the fixation point. These deviations in spacing are called the binocular disparities, which are referenced briefly below as the "disparities."

In stereo viewing the actual problem, in addition to the evaluation of the given trigonometric conditions, is to find out what image point of the real world or of the viewed object, which appears in the first of the stereoscopic images, corresponds to which image point in the second of the stereoscopic images. Or expressed differently, it is important to find out with respect to the human eye, which image point on the left retina corresponds to which image point on the right retina.

For human vision or 3D-stereo perception it is then necessary to use the disparities to draw conclusions about the three-dimensional structure of the perceived images. Or expressed differently, conclusions can be drawn from determined disparities about the depth information contained in the perceived image.

However, stereo methods formerly available must rely on powerful workspace computers (PCs or so-called Workstations), and to determine the desired depth information for a single pair of stereo images, for example, by use of a commercial workplace computer (with a clock frequency of about 90 MHz), a time in the range of about 3 to 5 minutes is needed.

However, if we try to shift these methods into special computer systems, the development and hardware expense will very quickly exceed the financially feasible limits. The market introduction of such systems has failed heretofore, either due to too low a processing speed, or due to too high a system price.

Stereo methods attempt to find mutually corresponding image points between a first (left) and second (right) stereo image, so that the distance of the points can be calculated from the relative displacement of the image points given a known camera position.

Among the conventional, computer-implemented stereo methods discussed above, we can distinguish essentially between so-called property-based stereo methods, intensity-based stereo methods, and phase-based stereo methods.

In the case of property-based stereo methods, before beginning the search for correspondence, certain properties (e.g., edges or intensity maxima) are extracted from the image data which are considered to be more stable than the raw image intensities. Such methods are stable, provided only a few stable properties (such as object edges) are extracted. They are also fast, since images only have to be processed at those sites where the properties are encountered. This leads to a notable reduction in data.

However, disparities can only be computed at those locations where the selected properties were found. At all other locations of the image, it is necessary to use an interpolation, which then necessitates additional, time-consuming calculation steps. The more dense the properties, the more difficult will it be to assign them to each other. The final allocation can only be made on the basis of complicated methods which leads to a reduced processing speed.

The publication WO 94/18797 A1, for example, describes a property-based method of this kind, and also a corresponding device.

Intensity-based stereo methods operate directly with the image brightnesses supplied by the stereo camera or the image recorder. Therefore, very stable algorithms have to be used to allocate the mutually corresponding brightnesses, and this requires significant computing time. Among the intensity-based methods, we can further differentiate between correlation-based methods and methods using dynamic programming.

The former attempt to refine a small image region of the left image in the right image. Usually methods are employed to maximize the correlation or to minimize the difference. If the image segments are selected large enough, then with these methods we obtain stable and dense disparity maps, and a real time processing is possible if special, complicated hardware is employed. However, the raw disparity maps typically contain only displacements in the range of accuracy of one image element (pixel), so that the resolution is limited. Only by the use of interpolation methods, or by iterative methods, can the accuracy of the disparities be improved to sub-pixel disparities.

Correlation-based methods, for example, are described in publication DE 34 25 946 A1 and in the article "A stereo-vision system for a planetary rover: calibration, correlation, registration and fusion" by Z. Zhang, in: Machine Vision and Applications, No. 10, 1997, pp. 27–34.

In methods using dynamic programming, the attempt is to minimize the local differences and these local minima are then expanded by means of suitable methods to the entire picture. Typically these methods also calculate disparities accurate only to one picture element, but this is not accurate enough for numerous applications.

In summary, we find that intensity-based methods do indeed provide a dense disparity map (one disparity value for nearly every image point), but minimizing of the error as in the method to minimize the difference, is time-consuming and therefore it is not suitable for real time applications. The reduction in the needed computation time can be achieved by the use of hierarchical methods, but it is only possible by the use of complicated algorithmic structures that cannot run in parallel and whose hardware implementation is exceptionally complicated and thus cost-intensive.

Furthermore, phase-based stereo methods are the subject to current investigations. These methods extract a local Fourier phase (usually by filtering using Gabor functions) from the raw image data, and then attempt either to bring these Fourier phase images (for the right or left image) (as described by Weng, for example) to coincidence, or to calculate the local displacement via the application of the Fourier displacement theorem (like that described by Sanger, Fleet & Jepson). The extraction of the local Fourier phase thus corresponds effectively to a local contrast tuning, so that many errors in other stereo methods caused by fluctuations in brightness are reduced. These phase-based stereo methods operate accurately down to the subpixel level and can also be implemented for real time applications. However, to achieve dense disparity maps, hierarchical methods are used that have to handle usually special recording situations in order to avoid errors (see Fleet). This complicates the used algorithms and makes a hardware implementation complicated and cost-intensive.

SUMMARY OF THE INVENTION

Consequently, it is the purpose of the present invention to specify an image processing device that can process stereoscopic images in real time and which can be implemented with simple means and low expense. Furthermore, it is the purpose of the present invention to specify a coherence detector that can be used with the stated device.

According to this invention, this problem is solved by a coherence detector with a number of n signal inputs, to which one input signal value each is applied, a first sorting device for sorting of the n input signal values according to their value and for parallel output of the n-sorted values, a number of n−1 subtracting devices for subtraction of two neighboring, sorted values, a second sorting device for sorting of the obtained n−1 differences with regard to their value and for output of the smallest difference value, a selection device which outputs the value pair of the input signal values belonging to the smallest, determined difference value, and an output device to which the output value pair is sent and which outputs its average value.

Alternatively, this problem is solved by a coherence detector with a number of n signal inputs to which a particular input signal value is applied, a window limiting device for output of those of the n-input signals whose input signal value resides within a predefined, finite window value range $[-x, \ldots, 0, \ldots, +x]$ with m+1 values at a spacing of 2x/m, a rounding device for rounding of the values output by the window-limiter device to the next nearest of the m+1 values of the predefined window-value range, an addressing driver unit, and a convolution device, where the convolution device has a number of m+1 signal inputs corresponding to the number of values of the window-value range, and those values of the n-signals are supplied to the particular k-th input by the addressing-driver unit; the signals have values of −x+(k−1)*2x/m, and thus drive a corresponding k-th of m+1 radiation emission elements, and the radiation thus moving to emission is acquired by a number of m+1 radiation reception elements corresponding to the number of values of the window-value range, and an evaluation device which determines the address k of the one of the m+1 radiation receiving elements which acquires the greatest radiation intensity, and outputs the value k of this address to an output terminal, and the output value represents the result of the convolution of the signals supplied to the convolution unit.

Furthermore, this problem is solved by an image processing device with displacement features for mutual shifting of the image data of a first image supplied to them and of a second image taken at a different recording angle, where the image data are picked off in parallel from the displacement features and are supplied in pairs to an outlet-connected disparity-detection device whereby the disparity-detection device uses one particular disparity element to calculate a disparity value representing spatial depth information for the particular pair of image data for each of the supplied image data pairs, and supplies the determined disparity values to a coherence-detection device according to one of claims 1, 2 or 3 to 6, where the output disparity value is determined for every shift of image data and represents the associated spatial depth information.

Due to this invented design, the supplied image signals can be processed at the speed that they are supplied by image receivers. Thus the image data processing is possible to attain depth information with little expense and in real time.

This high processing speed (real time) of the system is an important advantage over the state of the art. At an image rate of 25 images per second, for example, which are sent to the image receiver system and are processed by it in real time, the system or the method implemented with it is superior to the configuration or method known from the state of the art by a speed factor of 100.

In addition, the volume of the measured object to be measured, is no longer limited with respect to known systems. In particular, the measured range of the invented image processing device is determined only by a limitation of the used, imaging lens, and all optical add-on devices such as microscope, telescope lens or wide-angle lens, can be used in conjunction with the image recorders, provided they are adapted to them. In particular, with the invented system it is possible to evaluate a measured object without marking aids which are frequently required in the state of the art systems.

Due to the potential to evaluate a measured object without the ancillary marking, the requirement for a projection unit is also eliminated. Consequently, the invented device is more compact and light, and its handling is simplified and more versatile potentials will result.

In addition, a pretreatment of the measured object itself, for example, coverage of the measured object with bright powder to eliminate reflectivity and shine on the object surface before the measurement and removal of the powder after completion of the measurement, can be eliminated in the invented device. Due to the savings in these work steps, the invented device operates faster and at less cost.

In addition, with the invented device it is possible in a favorable manner to connect any type of image signal source. That is, the invented device is not limited to the realm of visible light, but rather the evaluation can take place, for example, for image signals in the infrared range.

With the invented coherence detectors it is possible, in particular, to determine those signals in real time, whose values are closest to each other from a number of input signals, and then to continue processing this "most similar" value.

Favorable refinements of the invention are provided in the subclaims.

The method of the present invention can be executed on the hardware shown or by means of software running on a suitable processor (in particular, a processor of a general purpose digital computer), or by any suitable combination of hardware and software. When software is used, the software can be accessed by a processor using any suitable reader device which can read the medium on which the software is stored.

The software may be stored on any suitable computer readable storage medium. The computer readable storage medium can include, for example: magnetic storage media such as magnetic disc (such as a floppy disc) or magnetic tape; optical storage media such as optical disc, optical tape, or machine readable bar code; solid state electronic storage devices such as random access memory (RAM) or read only memory (ROM); or any other physical device or medium employed to store a computer program.

The software carries program code which, when read by the computer, causes the computer to execute any or all of the steps of the methods disclosed in this application.

BRIEF DESCRIPTION OF THE FIGURES

The present invention is explained in greater detail below based on design examples with reference to the attached figures, wherein:

FIG. 1B is a schematic representation of a stereoscopic image acquisition to explain and define the terms;

DETAILED DESCRIPTION OF THE BEST MODE FOR CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believe to be the best mode of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

Figure 1A:
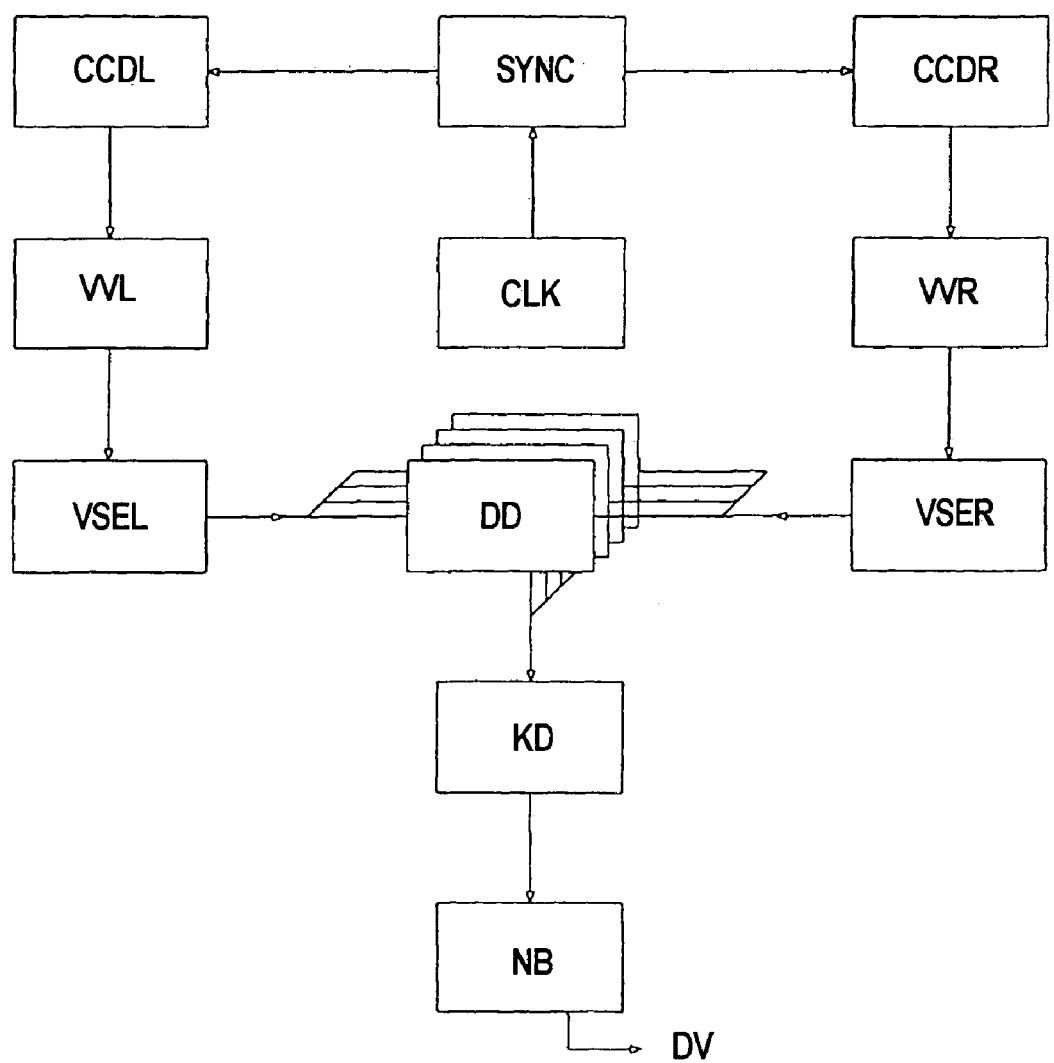
FIG. 1A is a general block diagram of the invented system.

FIG. 1A shows the invented stereoscopic image processing device to measure three-dimensional objects in real time, shown schematically as a block diagram.

The image processing device features a sensor head composed of two image recorders, an image recorder CCDL for the (first) left image and an image recorder CCDR for the (second) right image. One of these images is defined as the reference image for the subsequent processing. This means that determined disparity results are allocated to the image data of the reference image to produce a disparity map.

Figure 6:
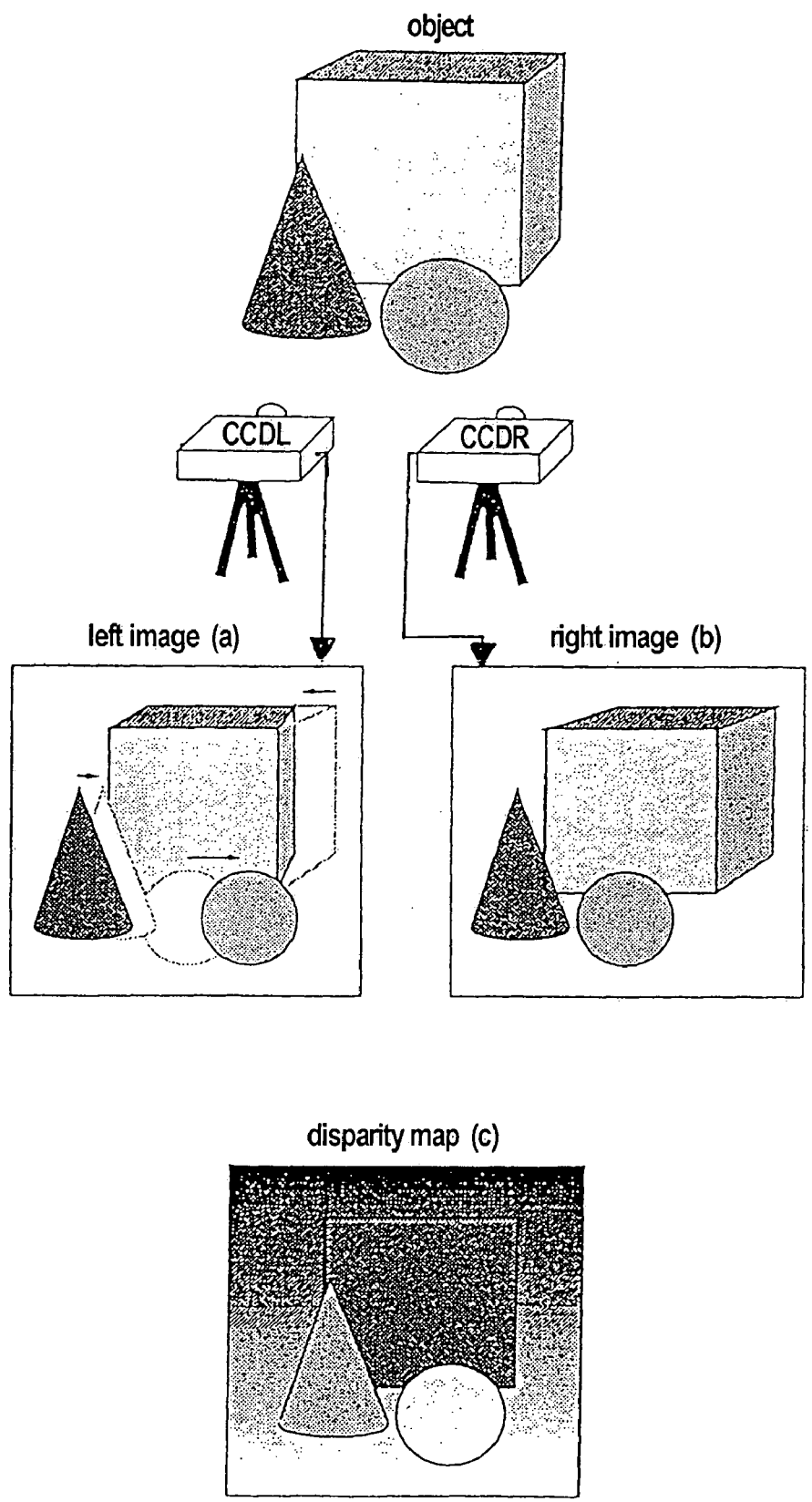
FIG. 6 is an example of two images of a first and second (or left and right) image recorder supplied as image signal stream, and a representation of the depth information determined by the invented device in the form of a so-called disparity map.

For example, the image recorders can be a pair of cameras with CCD image recorders that are arranged at a predetermined, known spacing d from each other and thus take easily distinguished pictures of the same object (see FIG. 1B and FIG. 6). In particular, the image recorders can hold moving pictures and send them to the device for subsequent, real-time processing. By means of an image recorder-synchronization device SYNC, the photographs of the image recorder devices CCDL, CCDR are synchronized in time, so that the left and the right image are taken synchronously to each other.

Depending on the distance of the object from the image recorders or cameras, the recorded image points have slight displacements, called disparities. That means that the same object will appear at different locations in the first or second image.

By means of a subsequent device designated as a disparity detector DD and a device designated as disparity-coherence detector KD (both to be explained in greater detail below), the actual disparities or displacements can be determined and then by means of trigonometric calculations under consideration of the known distance d between the image recorders CCDL, CCDR, the spatial distance of the particular object can be calculated and thus the sought depth information will be obtained.

The depth information calculated in this manner from two moving stereo pictures can be output roughly free of delay in real time as a video signal and represented as a third dimension (e.g., third image) as a half-tone picture or color image. Thus the real time processing of the system is governed in particular by serial processing of the image data supplied by the CCDL, CCDR image recorders.

A clock generator CLK is linked to the image recorder-synchronization device; this clock generator creates the timing signals to control and synchronize other components of the system.

The recorded image signals are supplied from the image recorders CCDL, CCDR to the associated preprocessing devices VVL, VVR. A brightness tuning of the two stereo images occurs in these preprocessing devices VVL, VVR before the following processing. This preprocessing of brightness is an advantage, since due to slightly differing image recording angle of the image recorders CCDL, CCDR, so-called shine light and reflections from (reflective) surfaces of the recorded objects can occur, which can lead to errors in the subsequent processing of the image data to ascertain the disparities, so that the disparity values might become unstable.

In the event that color images are being processed, as a part of the preprocessing the preprocessing devices can perform a break-down of the particular (first and second) color image data into several color image components (e.g., into the primary colors red, green, blue (RGB) or into the luminance and the two color-difference components). In addition, it is also possible to subject the first and second image data to different types of preprocessing.

After completion of the preprocessing of the image data by the preprocessing devices VVL, VVR, the image data of the first and second (or left and right) image is sent to devices VSEL, VSER for mutual displacement of the left and right image data with respect to each other. Or stated more precisely, this means that two displacement devices VSEL, VSER form one displacement unit, and one displacement stream of image data is present per displacement unit to "right" and to "left." One displacement unit should be provided for each type of image data, depending on the particular application. This means that in the case of pre-processing by break-down into the primary colors R, G and B, three displacement units can be provided, and of course, one for each primary color.

The disparities of image data shifted with respect to each other in this manner will then be determined for each particular pair of image data by the disparity detector DD and a particular set of obtained disparity values for the pair of image data will be evaluated by the disparity-coherence detector KD.

Figure 5:
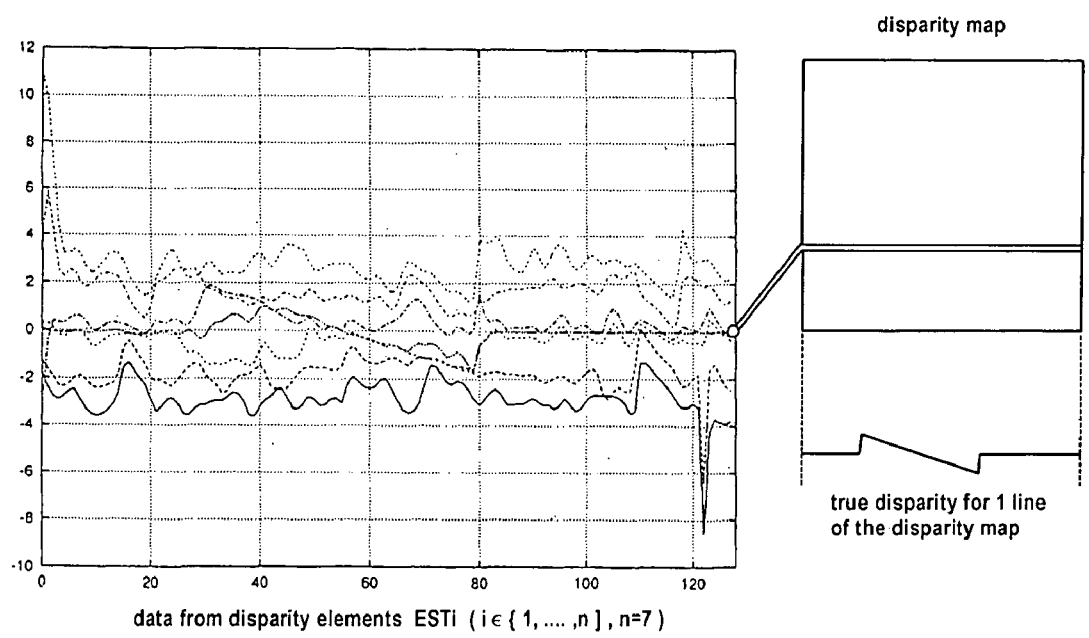
FIG. 5 is a diagram that illustrates the disparities determined by various disparity elements for all image elements of one image line; then by means of a coherence detector the actual or true disparity is determined from them in the profile of the image line.

This coherence detection with regard to the obtained disparities is based on the selection or determination of that one of the obtained disparity values that is nearly identical to at least one other of the obtained disparity values. Or stated differently, the disparity value is determined as the actual or true disparity value which is roughly identical to at least one other disparity value (i.e., in a predefined interval around it) or is identical to at least one other disparity value. Alternatively, that disparity value can be determined as actual disparity value, which represents the convolution result of the obtained disparity values. FIG. 5 illustrates this principle based on data from several (for example seven) disparity elements of a disparity detector.

The actual disparity values determined by this kind of disparity-coherence detector KD are then passed from it to a device NB for subsequent processing of image data. This device NB processes the disparity values so that they can be sent via an output connection DV to an optionally connected output device, such as a (not illustrated) display unit, and from there it can be sent along as a half-tone or color picture. For a better presentation of the disparity values, any occurring edge effects and a virtual limiting will occur within the framework of subsequent processing of image data.

An external control unit (not illustrated in the figure) is provided for configuration of the system; it can be implemented as a workplace computer with suitable interface to the system.

FIG. 1B is a schematic illustration to explain the principle of stereoscopic image acquisition. References CCDL, CCDR are the image recorders located at a distance d from each other; an object to be imaged or a point P1, P2 to be imaged on the light-sensitive acquisition sector of the particular image recorder, is focused via an inlet-connected objective lens. In this case the distance d is defined as the distance between the optical areas of the objective lens which are recorded as vertically running, dashed lines. The point P2 is farther away in the direction of the optical axis than the point P1.

As is indicated in the schematic illustration, the images of points P1, P2 on the recorded sectors of the image recorder are different as a function of the distance. Under the assumption that the image recorder consists of a certain number of image elements, the point P1 of the image recorder CCDL is imaged on a picture element j, whereas point P1 is imaged on image recorder CCDR on a picture element j+y. The picture elements j and j+y thus correspond with regard to their information content. Due to this shift (disparity) y, from the existing trigonometric conditions, we can determine the distance to point P1. Now let us define the distance to point P1 as a reference distance, which can be viewed as the basic measuring region of the device. Then the point P1 rests in a reference plane defined as the fixation plane, for which a (relative) disparity of zero is assumed. Or stated differently, the determined disparity is related to the fixation plane. Due to suitable selection of a preshift (e.g., y1 or y2) between the first and second image data to be evaluated, the fixation plane can thus be determined and the base measuring region can be determined. That means, before the image data of the first and second picture is sent to the displacement device VSEL, VSER, it will be shifted in sequence with respect to the amount of the preshift (e.g., y2).

Around the fixation plane in an interval of disparity values [−x . . . , 0, . . . , +x] is the so-called fusion region. The fusion region thus corresponds to a "range of contrast depth." The (relative) disparity values in the fusion region are determined on the basis of the additional shift of image data caused by the displacement devices VSEL, VSER. The greater the additional displacement which is evaluated, the greater is the fusion region and thus the "range of contrast depth" about the fixation plane. The additionally attainable displacement is thus in a relationship both with the number n of the displacement elements of the displacement devices to be described below, and also with their type of controller.

Figure 2:
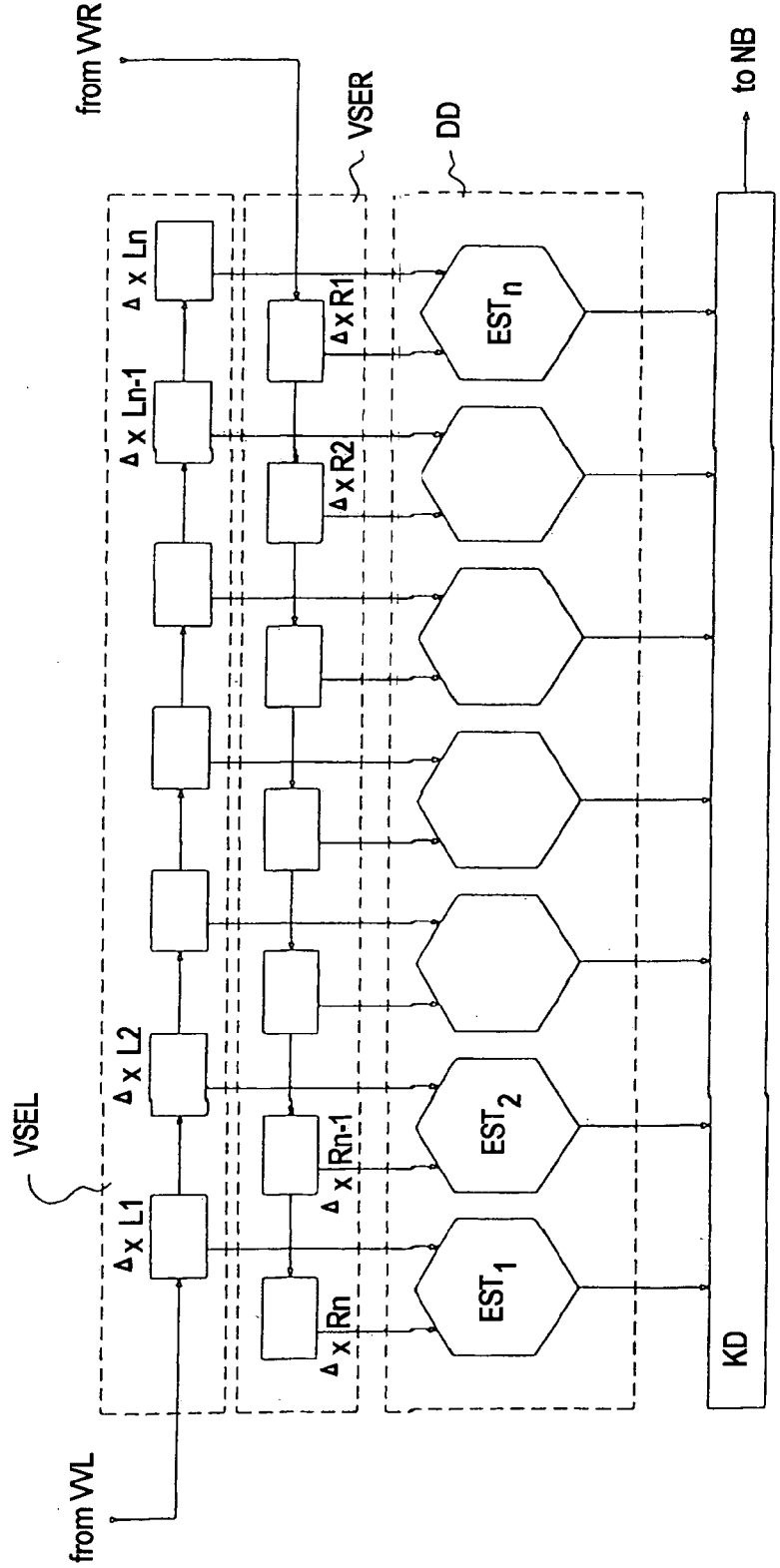
FIG. 2 is a block diagram that shows the image-signal displacement devices and details involving the disparity determination devices.

FIG. 2 of the drawings shows details of the image data displacement device VSEL for image data of the (first) left image, the image data displacement device VSER for image data of the (second) right image, which together form a displacement unit, and the disparity detector DD as disparity determining device. Thus the components according to FIG. 2 are not specified in any particular implementation using analog or digital design, and their description will be provided initially in general form, independently of the actual type of design.

The image data output by the particular preprocessing devices VVL, VVR are sent to the image data-displacement devices VSEL, VSER. This infeed takes place, as already mentioned above, with a pre-shift according to the desired base measuring region. In this particular case, to simplify the illustration, only one displacement unit is shown for one type of image data, for example for one of the primary colors R, G, B.

In this case the particular image data is sent to these displacement devices of the displacement unit serial and synchronously to each other. Each of the displacement devices VSEL, VSER consists of a number of displacement elements $\Delta X_{L1}$ to $\Delta X_{Ln}$, or $\Delta X_{R1}$ to $\Delta X_{Rn}$. These elements cause an additional shift of the infeed image elements by a small amount in the x-direction, i.e., in the direction of the main sensing when using line-by-line scanning image recorders. (FIG. 2 shows one example for n=7).

The image elements (pixels) are shifted with respect to each other, beginning with the first (but under consideration of the pre-shift) image element of the serial image data streams of the left or right image (e.g., image element of the upper, left corner of the particular image). The evaluation of the image elements with regard to the existing disparity now takes place in pairs. More precisely, a paired evaluation takes place with regard to the disparity, based on the shifted image data for pairs $(\Delta X_{L1}, \Delta X_{Rn})$, $(\Delta X_{L2}, \Delta X_{Rn-1})$, . . . $(\Delta X_{Ln-1}, \Delta X_{R2})$, $(\Delta X_{Ln}, \Delta X_{R1})$. The value of $\Delta X$ in the displacement can be adjusted to a value that corresponds to the length of one image element. If a greater dependability ("stability" of the implemented method) and accuracy are desired, then this shift can be adjusted to a value which is smaller than the length of one picture element, for example, to half the length of one picture element (pixel). However, this will require a greater number of elements (to be described below) for the disparity detector if the fusion range is to be held constant.

In the case of displacement devices VSEL, VSER to be designed as an analog circuit, they will consist of a chain or cascade of transit-time elements (delay elements) with corresponding signal pick-off. The amount of the displacement in the x-direction then corresponds to the transit time and can be selected one image element after another or in fractions of image elements.

In the case of displacement devices VSEL, VSER implemented as digital circuits, the particular unit consists of shift registers circuited in series; a corresponding clock signal is sent to these shift registers from the clock generator CLK (via an intermediate (not illustrated) frequency divider, if necessary). However, it is necessary in this case to convert analog image data by means of an analog/digital converter into digital image data. An analog/digital converter of this type can be provided before or after the particular preprocessor device VVL, VVR in the signal path, depending on whether the preprocessing is to occur by analog or digital means.

In the case of the digital shift register the displacement elements $\Delta X_{L1}$, $\Delta X_n$ of the particular displacement device are controlled for a pixel by pixel shift according to the clock signal supplied with the digital image data. If subpixel accuracy is required, then the already digitized data is sent to a special filter. For example, a displacement corresponding to one half picture element will be attained by subjecting two sequential image elements by means of a corresponding filter, to an average-value forming and then taking the obtained value as the signal value of the image element at the position shifted by one-half image element. This type of filtering essentially corresponds to a dithering of neighboring image elements.

In this regard the control can occur simultaneously for both displacement devices VSEL, VSER, or also in counterphase, depending on which additional displacement region ("range of contrast depth") is desired. With regard to the illustrated example of FIG. 2 with n=7, that means that with a simultaneous control, image data pairs which are shifted with respect to each other by +/−6, +/−4, +/−2, and 0, are evaluated and compared. In the case of counter-phase control, in the same example, displacements of −7, −5, −3, . . . , +5 and also −6, −4, −2, . . . , +6 are possible. Based on the greater additional displacement, an expanded range of contrast depth will be expected. Even though FIG. 2 presents an example for n=7, the invention is not limited to uneven values for n, but rather an even, whole number of displacement elements can also be used.

The pairs of image data stated above $(\Delta X_{L1}, \Delta X_{Rn})$, $(\Delta X_{L2}, \Delta X_{Rn-1}), \ldots (\Delta X_{Ln-1}, \Delta X_{R2}), (\Delta X_{Ln}, \Delta X_{R1})$ are then each sent to one of n elements $EST_1, \ldots, EST_n$ of the disparity detector DD for evaluation, in order to determine the corresponding disparity for the particular pair of image data. In this regard, note that based on the simplified illustration according to FIG. 2, only one disparity detector DD is illustrated. However, there are several displacement units (e.g., for R, G, B elements $EST_i$ of a disparity detector DD. For example, the evaluation can be gradient-based, tensor-based, energy-based or even based on the Reichard diffraction detection model. These evaluation principles are described in sufficient detail in the technical literature (such as in Barron, Fleet & Jepson, Adelson & Berger) and a detailed description will not be necessary at this point.

The disparity values output by the disparity elements $EST_i$ ($1 \leq i \leq n$) are then sent to the coherence detector KD, which determines the actual disparity value from the supplied values. In particular in the case of several disparity detectors DD, all outputs of the particular disparity detectors are sent to a downstream coherence detector KD.

Figure 3A:
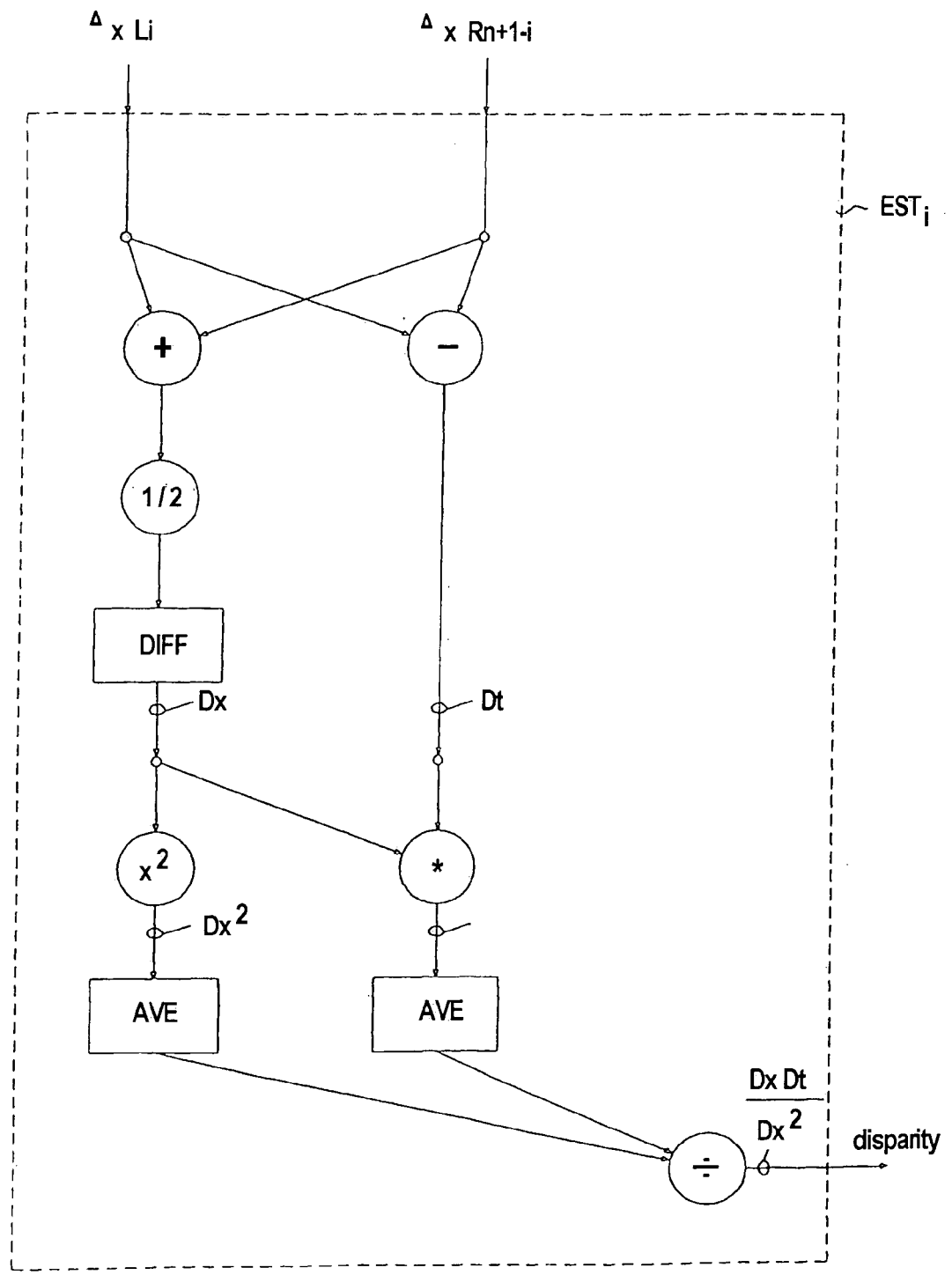
FIG. 3A is a functional diagram of a single, gradient-based or differential disparity element.

Now FIG. 3A shows a detailed functional diagram of a disparity element $EST_i$ where the evaluation is based on the gradient-based approach.

In this case, image data $\Delta X_{L1}, \Delta X_{Rn+1-i}$, ($1 \leq i \leq n$) is supplied to the particular disparity element $EST_i$. These are then sent to a unit performing an addition (reference symbol "+"), one picture element by picture element (pixel by pixel), then are sent to a multiplication unit denoted by reference symbol "½", which performs a multiplication of the added pixel values by a factor of ½, so that an average value is formed with regard to the supplied pair of image data. Subsequently, the image data processed in this manner passes through a differentiation filter DIFF. A simple differentiation filter DIFF can have filter coefficients like those provided in the following table 1.

TABLE 1

Filter coefficients of Differentiation filters DIFF

| Pixel site | x − 1 | x | x + 1 |
|---|---|---|---|
| Filter value | K1 = +0.5 | K2 = 0.0 | K3 = −0.5 |

The data values output from this filter are subjected on the one hand, to a pixel by pixel squaring in a unit denoted by the reference symbol "$x^2$", and the values obtained in this manner are then sent to an averaging filter AVE.

On the other hand, the data output from the filter DIFF are sent to a multiplication unit (reference symbol "*") where they are multiplied pixel by pixel with the difference of the data $\Delta X_{L1}, \Delta X_{Rn+1-i}$, obtained, one element at a time, by means of a subtraction unit (reference symbol "−"). The values obtained in this manner, which are applied to the output of the multiplication unit, are also sent to another averaging filter AVE.

For both averaging filters AVE, filter coefficients can be selected, like those presented in Table 2.

TABLE 2

Filter coefficients for Averaging Filters AVE

| Pixel site | x − 2 | x − 1 | x | x + 1 | x + 2 |
|---|---|---|---|---|---|
| Filter value | J1 = +0.0625 | J2 = +0.25 | J3 = +0.375 | J4 = +0.25 | J5 = +0.0625 |

The data values obtained at the outputs of the two averaging filters are subsequently sent to a division unit (reference symbol "÷") which outputs the determined disparity value as an output signal for the particular disparity element $EST_i$.

Since filtering is only needed in the x-direction for both used filters, which corresponds to filtering in a serial set of image data, a disparity element of this kind can be fully implemented in analog technology. However, a digital implementation is also possible.

The disparity values determined in this manner, which are output to the outputs of the disparity elements $EST_i$, are then sent to the disparity-coherence detector KD.

Figure 3B:
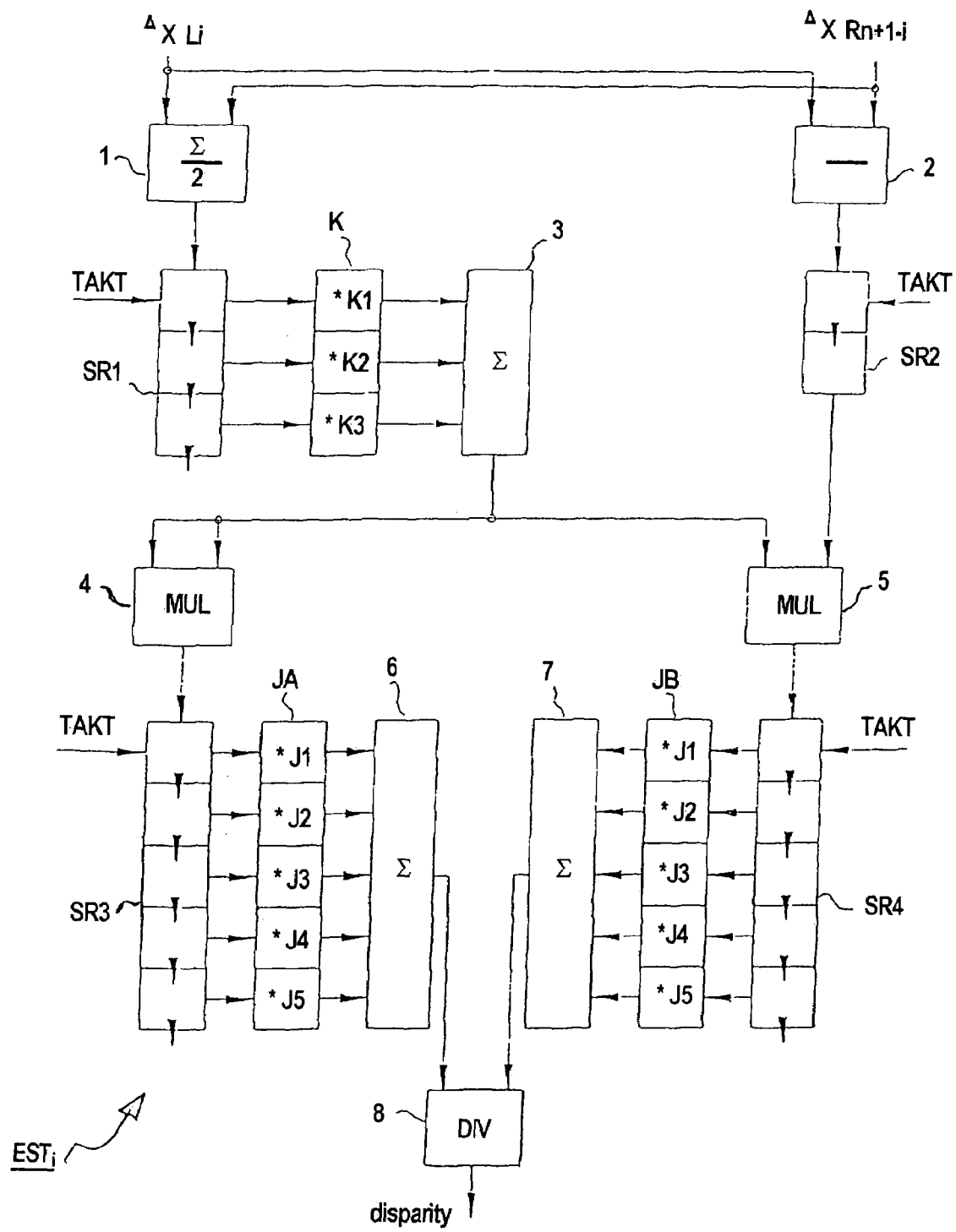
FIG. 3B is a block diagram of the hardware implementation of the individual disparity element described functionally according to FIG. 3A.

FIG. 3B shows a block diagram for the hardware implementation of an individual disparity element $EST_i$ functionally described above with reference to FIG. 3A. A disparity element EST consists of shift registers SR1 to SR4 clocked by a clock signal TAKT derived from the clock generator CLK to synchronize the entire circuit, for interim-saving of individual picture elements, and also consists of arithmetic logic circuits (average-value formers 1: "Σ2", subtracting unit 2: "−", multiplication devices 4, 5: MUL, summing units 3, 6, 7: "Σ", division unit 8: DIV). Now the filter designated in FIG. 3A by reference symbol DIFF is implemented by the shift register SR1, a coefficient multiplication unit K (K1, K2, K3) and the summing unit 3. In addition, the filters denoted by AVE in FIG. 3A are now composed of the shift register SR3, a coefficient multiplication unit JA (coefficients J1, J2, J3, J4, J5) and the summing unit 6; or by the shift register SR4, a coefficient multiplication unit JB (coefficients J1, J2, J3, J4, J5) and the summing unit 7. The disparity will be output to the output of the division unit 8. The circuit configuration shown in the block diagram entirely implements the operation and functioning of a disparity element EWST described and stated in connection with the functional diagram according to FIG. 3A.

Figure 4A:
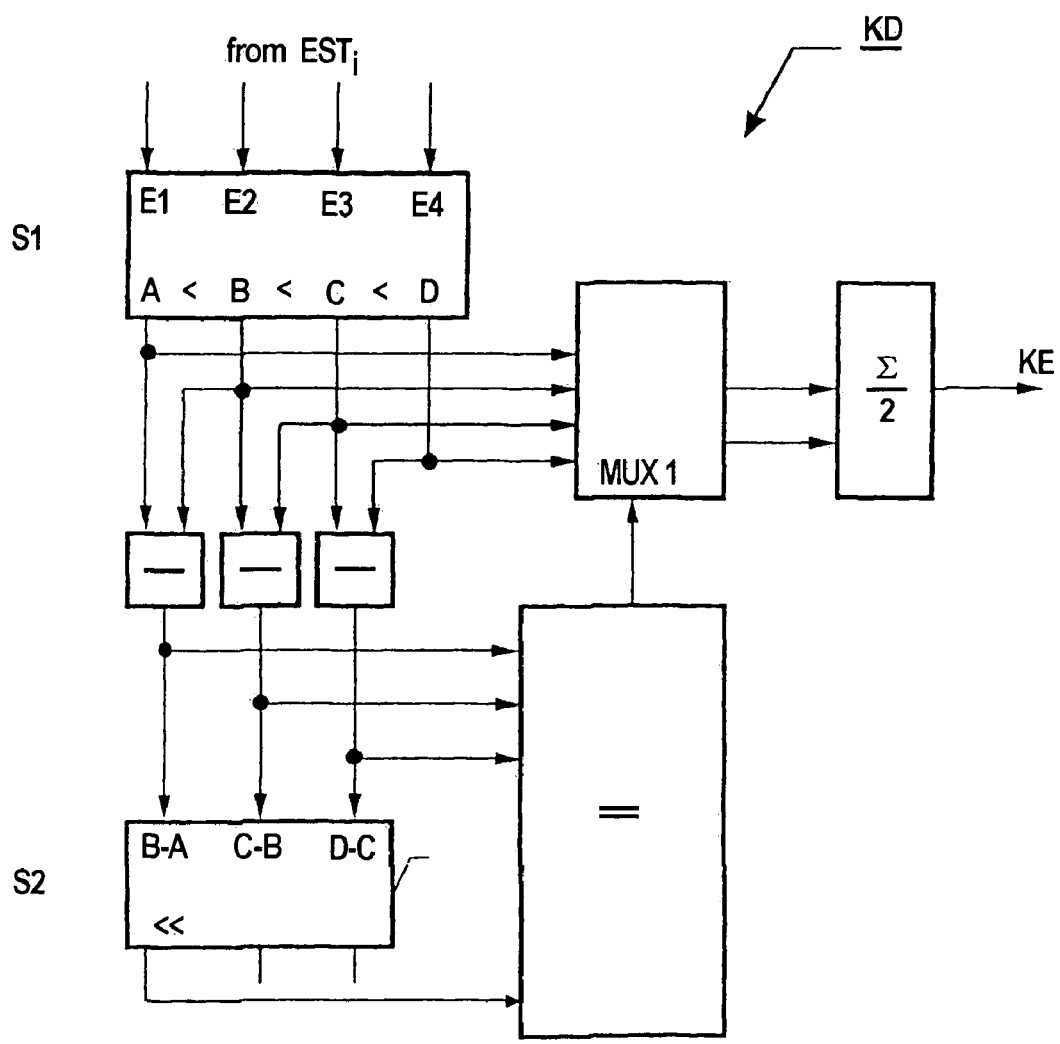
FIG. 4A is a block diagram of a first design example of a coherence detector.

FIG. 4A shows a block diagram of a coherence detector or disparity-coherence detector KD according to a first design example, while in this example, a coherence-detector KD with only four inputs is illustrated. For the case illustrated in FIG. 2, the circuit would have to be expanded accordingly to seven inputs or, in general, to n-inputs. In the event that several (z) shift units are equipped with allocated disparity detectors DD, each with n EST elements, then the circuit would have to be expanded to z*n inputs.

The data values on the determined disparities are applied to the inputs E1 to E4 and are sent from the (four not illustrated) EST elements $EST_i$, and the data values are sorted according to the size of the values and are output to the outputs A to D. In the present case, the smallest value is applied to output A, and the largest value is applied to output D. Sorting devices of this kind can be composed of comparitors and logic gates made of multiplexers, and are not explained in detail here. Each of the outputs A to D is sent to a multiplexer MUX1, whereas in addition, every two of the outputs are sent to a subtracting unit ("−"), in order to determine the differences B−A, C−B and D−C of the corresponding values. The differences are sent to another sorting device S2, which outputs the values of the differences sorted by magnitude. In the present case, only the smallest result (at the output "<<") will be additionally processed, which represents the value pair of the disparities which are "closest" to each other, that is, that have the smallest deviation from each other. The result of the sorting device S2, that is, the value at the output "<<", is then sent to a device "=" checking for equality, which compares the obtained result with the differences sent to the sorting unit S2, in order to determine which of the input values represents the result. This variant represents the simpler circuitry design, because it could also be determined from internal decision-making states of the sorting unit S2. The result obtained from the device checking for equality, is also used to drive the multiplexer MUX1, in order to send the two output signals of the sorting unit S1 belonging to the difference, to an average-value former (reference symbol "Σ/2"), which adds the two values for determining the average value, and then divides by two. This average value then represents the result KE, that is, the coherence value of the numerous determined disparity values.

One variant of the circuit described above consists in comparing the determined differences with a threshold value, and only the candidates or values are processed which are located below the particular threshold value, or within a value range determined by threshold values (e.g., corresponding to the fusion region). An outlet-connected switching unit then finds the greatest cluster of neighboring candidates. Both variants are possible and can supply the better results, relative to the particular application.

Figure 4B:
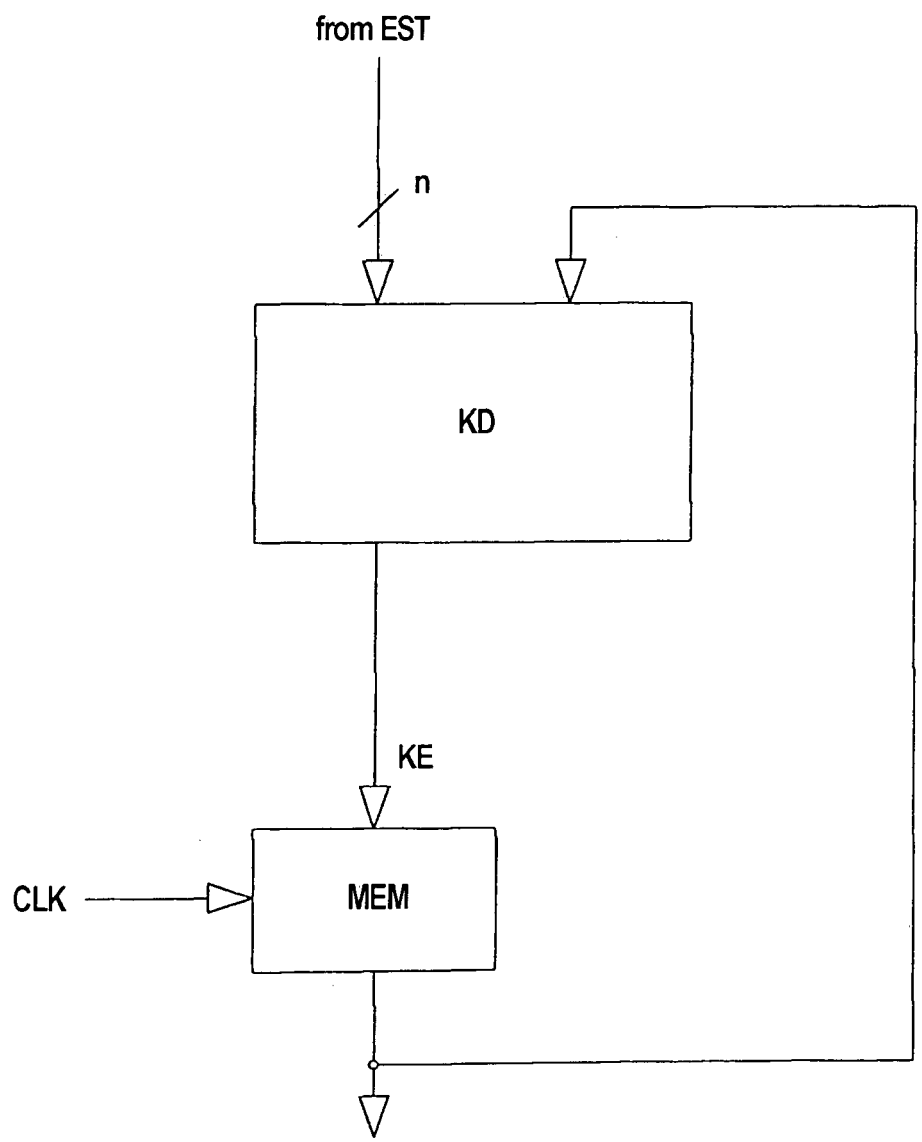
FIG. 4B is a schematic illustration of one design variant of a coherence detector.

FIG. 4B shows one design example of the coherence detector KD described above, in which additional data is sent to the coherence detector, in addition to output signals of the EST elements. This data can be used, in particular, when the image data is obtained in a line-nested, or "interlaced", manner, and if the entire image information of one full picture is composed, e.g., of two half images. Then the disparity values are determined for image data of one half image and the corresponding coherence value of the disparities are determined for image points of one half image. The values KE for the image points of the half image are interim-saved in a memory device MEM (with a memory capacity of one half image), and are read out during the next half image period and sent to the coherence detector KD to an additionally supplied input connection. The internal structure of the coherence detector KD is essentially identical to that described in conjunction with FIG. 4A, with the difference that it can also process an additional (the feedback) signal, and different variants are possible. In particular, the feedback coherence-disparity value can be sent to the sorting unit S1 and will be taken into account there, or it can come into play only later when forming the average value. In the latter case, it would be sent to the average-value former (reference symbol "Σ/2"). The circuit illustrated in FIG. 4A would then have to be modified accordingly.

Figure 4C:
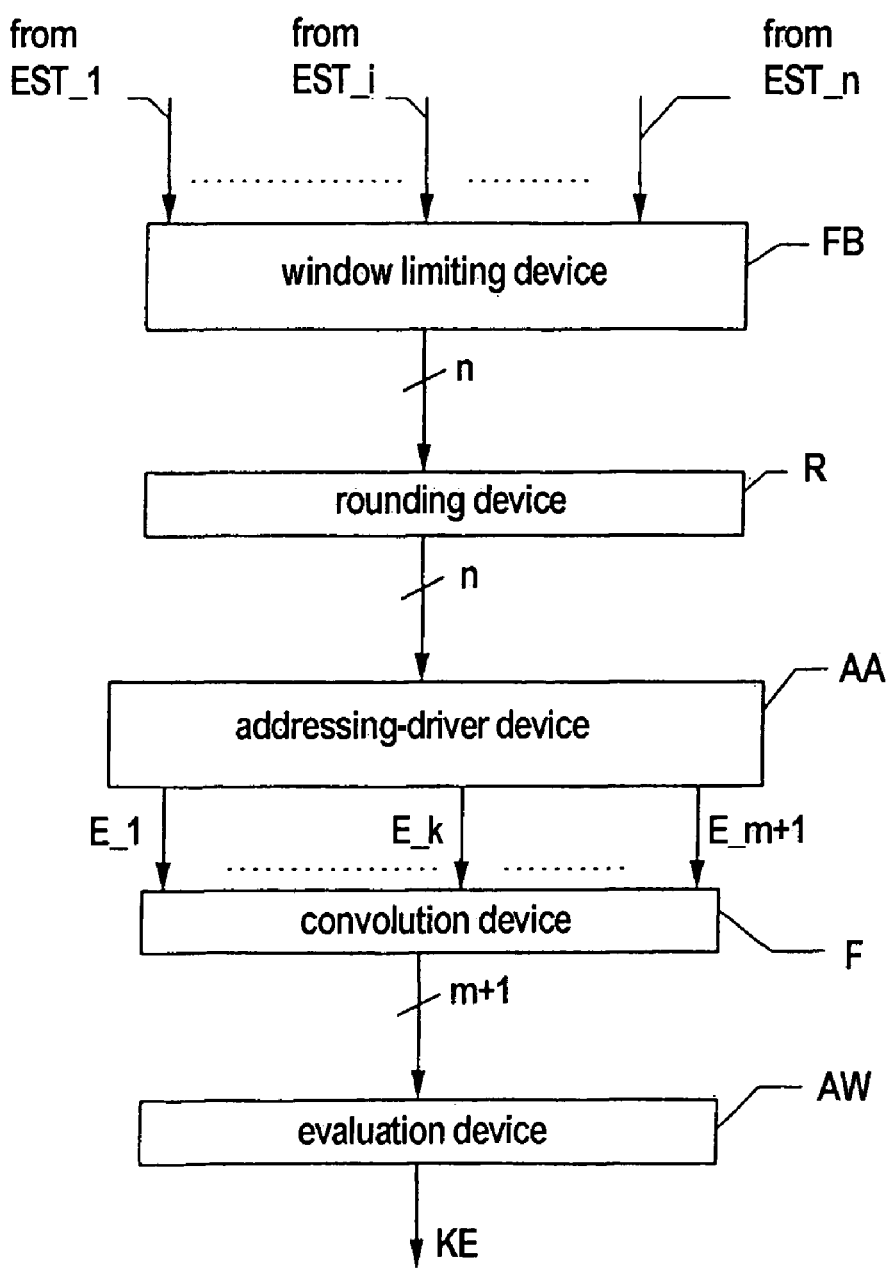
FIG. 4C is a second design example of a coherence detector, whose operation is based on the convolution principle.
Figure 4D:
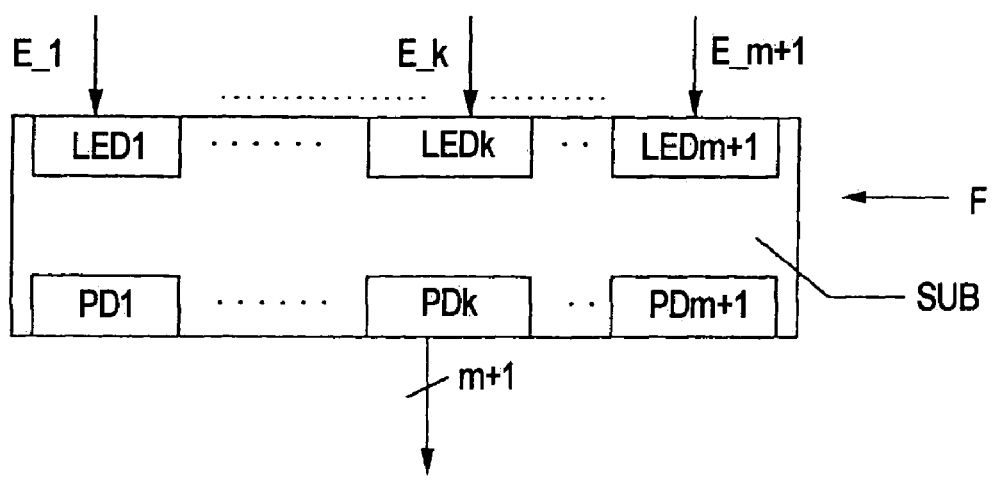
FIG. 4D are Details of the implementation of the convolution device in the coherence detector illustrated in FIG. 4C.

In this manner, the "true" disparity value (coherence-disparity value) for one full image can be obtained under consideration of the two half images. FIG. 4C shows a second design example of a coherence detector whose mode of operation is based on the convolution principle, and FIG. 4D presents details of the implementation of the convolution device in the coherence detector illustrated in FIG. 4C.

For a better understanding we will first explain in general the principle of convolution for the present case. The purpose of the coherence detector is to determine that value from among the supplied input values, which is as close as possible to one or several others, as already explained above. During the convolution, the obtained values are convoluted with each other, in order to determine which value in the particular value range corresponds to the convolution value or convolution result, and thus is that value which is as close as possible to one or several other values (that is, the differences between the convolution value and the surrounding ones are less than or equal to a default value). This can be illustrated by stating that a suitable interval, symmetrical to the particular value, is superimposed on each of the values to be convoluted with each other. Given a suitable selection of the interval (which is the same for every value) there will be an overlapping of some of the individual intervals. The area within the particular value range where most of the individual intervals overlap each other (corresponding to the intersection value which consists of the greatest number of the individual values), or the area that has the greatest percentage surface area of the overlapping intervals ("greatest integral") then represents the result of the convolution.

FIG. 4C shows one hardware solution that carries out this kind of convolution operation in real time; such operations formerly could only be carried out in a time consuming manner, for instance, by the use of digital signal processors.

In this case the input signal values supplied from n disparity elements $EST_i$ (1<=I<=n) from a disparity detection device DD to the particular signal inputs are sent initially to a window-limiting device FB. The window limiting device FB then outputs those of the n input signals whose input signal value is located within a predetermined window value range. This range is preferably a finite window value range in the interval $[-x, \ldots, 0, \ldots +x]$ with m+1 values at a spacing of 2x/m, where the limits of the value range +/−x are determined by the disparity values of the fusion region about the fixation plane (with a disparity of zero).

Those of the n input signals whose signal values do not lie within this window range, will be converted at the appropriate output of the window limiting device into a state (e.g., a high-impedance state) that indicates this fact and prevents additional processing of the associated signals.

Only those of the input signals with an input signal value within the window range will be additionally processed by a follow-on rounding device R. The rounding device R conducts a rounding of the values output by the window limiting device FB to the nearest m+1 values of the preset window range. Thus the (infinite) number of values output by the particular disparity elements $EST_i$ will be reflected onto a finite number of m+1 values, which are subjected to the subsequent convolution. Thus the accuracy of the convolution can be increased by an increased number m.

Now after the window limiting by the window limiting device FB and rounding by the rounding device R, a maximum of n signals (if all input signal values rest within the window range) each with a respective one of m+1 signals values is present.

These signals are sent via an addressing-control unit AA to a convolution device F. Thus according to the particular value of the signals, a convolution device allocated to this signal input will be triggered. That means that those of the signals supplied to the addressing-control device AA (maximum n) whose values are $-x+(k-1)*2x/m$, will thus be sent to an associated, k-th of m+1 signal inputs $E_k$ of the convolution device F, and to each particular signal input $E_k$ of the convolution device F, one radiation emission element is assigned which is driven by the supplied signals. In this case the particular radiation emission elements are designed so that the more radiation will be emitted, the more the supplied signals are used to drive the particular radiation emission elements. Or stated differently and more simply, a radiation emission element k emits twice as much radiation when two signals have the value $-x+(k-1)*2x/m$, than if only one signal with the corresponding value is contributing to driving the k-th radiation emission element.

The radiation thus brought to emission is received by a number of m+1 radiation reception elements corresponding to the number of values of the window range. In addition, an evaluation device AW is provided which determines the address k of the one of the m+1 radiation reception elements that acquires the greatest radiation intensity. The value k of this address is output to one output connection KE, and the output value represents the result of the convolution of the signals sent to the convolution device.

FIG. 4D presents details of the convolution device F. The illustrated radiation emission elements can be light emitting diodes $LED_1, \ldots, LED_k, \ldots LED_{m+1}$, for example. In this case, light can be emitted in the visible range, but also radiation emission elements emitting in the infrared range can be used. The light emitting diodes are located, in this case, at the top side of a transparent substrate SUB. This substrate can be a glass substrate, for instance. Radiation reception elements PD1, ..., PDk, ..., PDk+1 are located in appropriate positions opposite the diodes and facing the bottom side of the substrate. These radiation reception elements can be photo diodes (e.g., pn-photo diodes, pin-photo diodes, Shottky photo diodes, etc.) or even photo transistors, for example. Of course, it is self-evident that the used radiation reception elements are tuned to the wavelength range of the employed radiation emission elements, and their operating range is tuned to the radiation emission elements.

The operation of the convolution device F will be illustrated below based on one example. Let us assume that of the m+1 radiation emission elements, only the elements k−1, k, and k+1 are driven, since only the (rounded) values of the addressing-control unit corresponding to them are supplied. Furthermore, for this example, let us assume that each of the three values was determined only once for each of the n disparity elements. This means that in this example, the radiation emission elements k−1, k, k+1 are driven identically and consequently output the same amount of radiation. The emitted radiation propagates through the substrate SUB, is spatially overlapped and moves to the radiation reception elements. Now the k-th radiation reception element receives the radiation emitted from the k-th emission element, and also the radiation output from the two directly neighboring (k−1, k+1) emission elements. The two neighboring reception elements k−1, k+1 accordingly receive the radiation of the emission elements k−1, k, k+1 and k+1, k, k−1. Based on the spatial propagation and the different distance, however, for reception element k+1 the percentage of the emission element k−1 is more strongly attenuated than for reception element k. Consequently, the reception element k receives the greatest radiation intensity and the evaluation device AW determines the value k of the address as a result of the convolution and sends it to connection KE. In this specific example, the result of the convolution thus corresponds to the average value.

In another (not illustrated) variant, the convolution device consists of a corresponding array of m+1 counters. Based on the preceding rounding, disparity values neighboring each other with regard to their magnitude, are rounded to the same value, so that the corresponding, k-th counter of the array, which is allocated to the corresponding disparity value, is accordingly incremented repeatedly, and specifically by the number of disparity values (in the cluster of neighboring values) which supplies the same rounding result. The following evaluation device then outputs the address k of the counter with the greater counter reading as the result KE.

FIG. 5 illustrates the mode of operation of the disparity-coherence detectors KD described above. In the graphic representation according to FIG. 5, the picture element positions or pixel numbers (related to the first or second picture selected as reference picture) are plotted on the abscissa, and on the ordinate for each picture element, the n disparity values supplied to the coherence detector KD and which are output from the disparity elements $EST_1$ to $EST_n$. In the present case, for example, n=7 disparity elements $EST_i$ for one disparity detector DD. The disparity value of zero is thus related to the fixation level and corresponds to the distance to the fixation plane. The values of the disparity surrounding this plane are in the range of −4 to +4, for example, and thus represent the fusion region and correspond to that distance which is nearer or farther than the fixation plane.

The present n disparity values for each picture element are processed or compared in real time by the particular, selected coherence detector KD according to the first or second design example, and that disparity value is output as the actual disparity value, which is roughly identical with the greatest number of the other supplied disparity values. More precisely, this means that as many disparity values as possible should be located in one interval of e.g., about 0.2 to 0.4 about the particular disparity value, so that this particular disparity value is the actual disparity value. It is simplest if several disparity values have the same value for a particular picture element. In the graphic representation according to FIG. 5, this case corresponds to a point of intersection of at least two of the n disparity values for one particular picture element. The line-by-line analysis of the n disparity values for each picture element of a particular line then provides a profile of the actual disparity for a particular line of the picture, as is illustrated in the right part of FIG. 5, and from the totality of the analyzed image lines, a disparity map can be determined or represented in the form of a third image (upper right image in FIG. 5).

Due to a suitable selection of the number n of disparity elements EST, the accuracy or reliability of the true disparity determined by the coherence detector can be increased, since more disparity values will then be present which are evaluated with regard to their coherence. In particular, each disparity element EST computes the disparity in the entire measured range, that is, fully parallel. Now many of the iterative approximations of rough to precision measuring ranges known from many state of the art implementations, can be eliminated in order to obtain the actual disparity value.

In addition, based on the values obtained from the disparity elements EST of the disparity detector DD, supplemental information can be obtained with regard to the reliability of the determined disparity. This means that if we view the disparity values at one point of the line (see FIG. 5), then the nearness of the neighbors to the exact disparity value is a measure for the dependability of the determined disparity. Thus a dependability map can be determined over the entire picture that provides in real time an indication about the probability of the accuracy of the determined disparity.

FIG. 6 shows another example of an object located in a space with a "left picture" (a) and a "right picture" (b) taken by the image recorders CCDL, CCDR. In both pictures there is a first and second object against an additional (third) object, which is visible in the background of the illustrated, spatial scene. Based on the evaluation by the invented optical sensor system for processing of stereoscopic pictures in real time, a disparity map (c) is obtained that can be presented as a half-tone picture (or as a color picture) on a video display. According to FIG. 6, in the disparity map an object located in foreground is presented bright, an object located in the middle depth region is represented by a bright to dark gray value appropriate to the depth, and the object in the picture background is presented as nearly black as the object with the greatest depth in the disparity map. The type of presentation described in the given example according to FIG. 6 for the depth information is, however, not absolutely required. Likewise, objects in the foreground can be shown as dark and objects in the background can be shown as bright.

In addition, the data on the displayed disparity map can also be used for control purposes, by using this data, for example, to control robots in assembly processes, and to conduct an actual-desired comparison with previously defined 3D manufacturing data and the depth information determined from the disparities.

Once a predetermined minimum depth value is reached by unmanned vehicles, they can be caused to make a course correction to avoid collisions, and this principle can also be used to implement passive and/or active spatial warning and anti-collision systems in motor vehicles. Additional potential uses for the system are in medical technology, for example, in three-dimensional sensing of body contours for classification of dysplasia. In particular there are potential uses in jaw surgery or with flexible or rigid endoscopes.

INDUSTRIAL APPLICABILITY

It is clear that the improved processing speed (real time) of the system is an important advantage over the state of the art and has wide Industrial Applicability. At an image rate of 25 images per second, for example, which are sent to the image receiver system and are processed by it in real time, the system or the method implemented with it is superior to the configuration or method known from the state of the art by a speed factor of 100. Due to the invention the supplied image signals can be processed at the speed that they are supplied by image receivers. Thus the image data processing is possible to attain depth information with little expense and in real time.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

What is claimed is:

1. A coherence detector having a number of n signal inputs ($EST_i(1<=I<=n)$; E1, E2, E3, E4), to which one input signal value each is applied, comprising in operative combination:

(a) a first sorting device (S1) for sorting of the n input signal values (E1, ..., E4) according to their value (A, B, C, D) and for parallel output of the n-sorted values;
    (b) a number of n−1 subtracting devices ("−") for subtraction of two neighboring, sorted values ((D−C), (C−B), (B−A));
    (c) a second sorting device (S2) for sorting of the obtained n−1 differences ((D−C), (C−B), (B−A)) with regard to their value and for output of the smallest determined difference value ("<<");
    (d) a selection device ("=", MUX1) which outputs the value pair of the input signal values belonging to the smallest determined difference value ("<<"); and
    (e) an output device ("Σ/2") to which the output value pair is sent, and which outputs an average value (KE).

2. A coherence detector according to claim 1, wherein:

(a) the selection device ("=", MUX1) has a comparison unit which determines the particular difference value which corresponds to the smallest difference value by comparison of the smallest difference value with the n−1 difference values; and
    (b) a multiplexer unit (MUX1) which outputs that value pair of the input signal values with the smallest difference, based on the comparison result provided by the comparison unit.

3. A signal processing device for processing coherence detector signals having a number of n signal inputs ($EST_i$), with $1<=i<=n$, to which a particular input signal value is applied, comprising in operative combination:

(a) a window limiting device (FB) for output of n-input signals having input signal values within a default defined, finite window value range with m+1 values at a spacing of 2x/m;
    (b) a rounding device (R) for rounding of the values output by the window-limiter device (FB) to the next nearest of the m+1 values of the default set window-value range;
    (c) an addressing driver unit (AA), and a convolution device which has a number of m+1 signal inputs corresponding to the number of values of the window-value range, said addressing-driver unit supplies the n-signals to a particular k-th input, which n-signals have values of −x+(k−1)*2x/m, to drive a corresponding k-th of m+1 radiation emission element and disposed so that emission radiation is acquired by a number of m+1 radiation reception elements corresponding to the number of values of the window-value range; and
    (d) an evaluation device which determines the address k of at least one m+1 radiation receiving element which acquires the greatest radiation intensity, and outputs the value k of this address to an output terminal (KE), which output value represents the result of the convolution of the signals supplied to the convolution unit.

4. A signal processing device according to claim 3, wherein said radiation emission elements of the convolution device are light emitting diodes (LED) and the radiation receiving elements are photo diodes (PD).

5. A signal processing device according to claim 4, including a transparent substrate (SUB) having a top side and a lower side, and wherein said light emitting diodes are located at the top side of a transparent substrate and the photo diodes are located opposite the light emitting diodes at the lower side of said substrate.

6. A signal processing device according to claim 5, wherein said transparent substrate (SUB) is a glass substrate.

7. An image processing device having displacement features (VSEL, VSER; $\Delta X_{L1}, \ldots, \Delta X_{Ln}, \Delta X_{R1}, \ldots, \Delta X_{Rn}$) for mutual shifting of the image data of a first supplied image and of a second supplied image taken at a different recording angle, comprising in operative combination:
   (a) means for picking off the image data in parallel from displacement features (VSEL, VSER) and supplying in pairs (($\Delta X_{L1}, \Delta X_{Rn}$), ($\Delta X_{L2}, \Delta X_{Rn-1}$), ... ($\Delta X_{Ln-1}, \Delta X_{R2}$), ($\Delta X_{Ln}, \Delta X_{R1}$)) to an outlet-connected disparity-detection device (DD; $EST_1, \ldots, EST_n$);
   (b) a disparity-detection device (DD) having a particular disparity element ($EST_1, \ldots, EST_n$) for determining a disparity value representing spatial depth information for the particular pair of image data for each of the supplied image data pairs (($\Delta X_{L1}, \Delta X_{Rn+1-i}$)); and
   (c) said disparity-detection device outputs the determined disparity values to a coherence-detection device (KD) in which the output disparity value (KE) is determined for every shift of image data and represents the associated spatial depth information.

8. An image processing device according to claim 7, wherein
   (a) the image data picking means supplies image data as half images, line-nested, during two sequential half image periods; and
   (b) which includes:
      (i) a memory device (MEM) for interim storage of actual disparity values determined by the coherence-detection device (KD) during a first half image period; and
      (ii) means for supplying the interim-stored disparity values to said coherence-detection device (KD) during the subsequent, second half-image period, in addition to the disparity values ascertained by the disparity-detection device (DD), from which the actual disparity values for the full image may be determined.

9. An image processing device according to claim 7, which includes:
   (a) a preprocessing device for receiving said supplied image data of the first image and of the second image; and
   (b) said preprocessing device produces different types of image data from the image data of the first image and of the second image and outputs said image data to displacement devices and to at least one disparity-detection device (DD) for the particular type of image data.

10. An image processing device according to claim 7, wherein said image picking device supplies the image data of the first and second image serially and synchronized to each other.

11. An image processing device according to claim 10, wherein said displacement devices shift the image data point by at least a fraction of an image point with respect to each other.

12. An image processing device according to claim 11, wherein:
   (a) said image picking device supplies said image data as analog image signals; and
   (b) said displacement devices comprise analog delay-line network chains, and shifts of the image elements by adjusting corresponding transit time.

13. An image processing device according to claim 11, wherein:
   (a) said image picking device supplies said image data as digital image signals; and
   (b) said displacement devices comprise clocked shift registers.

14. An image processing device according to claim 11, wherein:
   (a) said image picking device supplies said image data as digital image signals; and
   (b) said displacement devices comprise filters that interpolate the image data values between neighboring image elements.

15. An image processing device according to claim 7, wherein at least one disparity element determines the particular disparity value by a gradient-based processing.

16. An image processing device according to claim 7, which includes a display device to which the actual disparity values (KE) are input and displayed as a disparity map representing the depth information.

17. A method of image processing having displacement steps (VSEL, VSER; $\Delta X_{L1}, \ldots, \Delta X_{Ln}, \Delta X_{R1}, \ldots, \Delta X_{Rn}$) for mutual shifting of the image data of a first supplied image and of a second supplied image taken at a different recording angle, comprising the following steps in operative order:
   (a) picking off said image data in parallel from displacement features (VSEL, VSER);
   (b) supplying said image data in pairs (($\Delta X_{L1}, \Delta X_{Rn}$), ($\Delta X_{L2}, \Delta X_{Rn-1}$), ... ($\Delta X_{Ln-1}, \Delta X_{R2}$), ($\Delta X_{Ln}, \Delta X_{R1}$)) to an outlet-connected disparity-detection device (DD; $EST_1, \ldots, EST_n$);
   (c) determining in said disparity-detection device a disparity value representing spatial depth information for the particular pair of image data for each of the supplied image data pairs (($\Delta X_{L1}, \Delta X_{Rn+1-i}$));
   (d) outputting determinied disparity values to a coherence-detection device (KD); and
   (e) determining in said coherence-detection device actual disparity values (KE) for every shift of image data representative of associated spatial depth information.

18. A method of image processing according to claim 17, wherein:
   (a) said image data supplying step includes supplying image data as half images, line-nested, during two sequential half image periods; and
   (b) the method includes the steps of:
      (i) storaging in a memory device (MEM) for an interim period said actual disparity values determined by the coherence-detection device (KD) during a first half image period; and
      (ii) supplying the interim-stored disparity values to said coherence-detection device (KD) during the subsequent, second half-image period, in addition to the disparity values ascertained by said disparity-detection device (DD), from which the actual disparity values for the full image may be determined.

19. A method of image processing according to claim 17, which includes:
   (a) the step of providing a preprocessing device for receiving said supplied image data of the first image and of the second image; and
   (b) producing from said preprocessing device different types of image data from the image data of the first image and of the second image and outputting said image data to displacement devices and to at least one disparity-detection device (DD) for the particular type of image data.

20. An image processing computer program product, comprising:
  (a) a computer useable medium having computer readable program code embodied thereon for performing displacement steps (VSEL, VSER; $\Delta X_{L1}, \ldots, \Delta X_{Ln}, \Delta X_{R1}, \ldots, \Delta X_{Rn}$) for mutual shifting of the image data of a first supplied image and of a second supplied image taken at a different recording angle; and
  (b) said computer readable program code causes a computer to:
    (i) determine a disparity value representing spatial depth information for the particular pair of image data for selected image data pairs (($\Delta X_{L1}, \Delta X_{Rn+1-i}$)) supplied to said computer; and
    (ii) determine for every shift of image data actual disparity values (KE) representative of associated spatial depth information.

* * * * *